(12) United States Patent  (10) Patent No.: US 8,488,627 B2
Hunter  (45) Date of Patent: Jul. 16, 2013

(54) MULTI-COMMUNICATIONS-MEDIA NETWORK DEVICE

(75) Inventor: David Hunter, Santa Barbara, CA (US)

(73) Assignee: WireFi Networks, Inc., Santa Barbara, CA (US)

( * ) Notice: Subject to any disclaimer, the term of this patent is extended or adjusted under 35 U.S.C. 154(b) by 174 days.

(21) Appl. No.: 13/116,291

(22) Filed: May 26, 2011

(65) Prior Publication Data

US 2011/0292921 A1 Dec. 1, 2011

Related U.S. Application Data

(60) Provisional application No. 61/348,649, filed on May 26, 2010.

(51) Int. Cl.
*H04J 3/22* (2006.01)
(52) U.S. Cl.
USPC .......................................... 370/469
(58) Field of Classification Search
None
See application file for complete search history.

(56) References Cited

U.S. PATENT DOCUMENTS

| | | | |
|---|---|---|---|
| 4,627,052 A | 12/1986 | Hoare et al. | |
| 6,516,352 B1 * | 2/2003 | Booth et al. | 709/250 |
| 6,947,736 B2 | 9/2005 | Shaver et al. | |
| 7,437,140 B2 | 10/2008 | Iwamura | |
| 7,463,877 B2 | 12/2008 | Iwamura | |
| 2003/0224784 A1 | 12/2003 | Hunt et al. | |
| 2004/0085894 A1 | 5/2004 | Wang et al. | |
| 2005/0013307 A1 | 1/2005 | Park | |
| 2005/0015805 A1 | 1/2005 | Iwamura | |
| 2005/0063355 A1 | 3/2005 | Iwamura | |
| 2007/0286192 A1 | 12/2007 | Pantelias | |
| 2009/0190589 A1 * | 7/2009 | Bains et al. | 370/392 |
| 2010/0067539 A1 * | 3/2010 | Lin et al. | 370/419 |
| 2010/0074263 A1 * | 3/2010 | Bry et al. | 370/401 |

OTHER PUBLICATIONS

World Intellectual Property Organization, International Search Report and Written Opinion for International Application No. PCT/US2011/038224, mail date Oct. 5, 2011, pp. 1-10.
Homeplug Powerline Alliance, HomePlug AV White Paper, 2005, pp. 1-11, version HPAVWP-050818.

* cited by examiner

*Primary Examiner* — Yong Zhou
(74) *Attorney, Agent, or Firm* — SoCal IP Law Group LLP; John E. Gunther; Steven C. Sereboff (57) ABSTRACT

A network device may include a processor executing higher layer processes including layers of a protocol stack higher than a media access layer, a first physical interface (PHY) coupled to a first communications medium, a second PHY coupled to a second communications medium, and a media access controller (MAC) to execute the media access layer of the protocol stack, the MAC coupled to the higher layer processes, the first PHY, and the second PHY. Media selection logic may select one of the first PHY and the second PHY for communication with a target device designated by a target MAC address provided by the higher layer processes.

19 Claims, 9 Drawing Sheets

MULTI-COMMUNICATIONS-MEDIA NETWORK DEVICE

RELATED APPLICATION INFORMATION

This patent claims benefit of the filing data of Provisional Patent Application No. 61/348,649, filed May 26, 2010, titled "Powerline Ethernet Interface" which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to local area networks that use a combination of two or more communications media, which may include both wireless and wired communications media.

2. Description of the Related Art

A variety of communications media and standards are available for use in network communications. These standards are usually defined in accordance with the seven-layer OSI (Open System Interconnect) model. The lowest layer of the OSI model is the physical layer, which defines how to transmit bits over a communications medium. In this patent, the term "communications media" means any media for conveying or transmitting information. Communications media include electrical wires, coaxial cables, optical fibers, and wireless communications using radio-frequency, optical, or acoustic carrier waves.

Standard physical layer protocols include various Institute of Electrical and Electronic Engineers (IEEE) Std. 802.3 "Ethernet" protocols (10BASE-T, 100BASE-T, etc.); wireless communications protocols in accordance with IEEE Std. 802.11, commonly called Wi-Fi®; SONET (synchronous optical network) protocols; and other protocols defined by an industry group or standard-setting authority. An emerging technology for network communications is power line communications (PLC), which may be in accordance with standards such as IEEE Std 1901-2010 or the International Telecommunications Union ITU-T G.hn standard. ITU-T G.hn is also a standard for phone line communications and communications over TV cable.

Many of these protocols define both the physical layer and the data link layer (the second lowest layer), as well as higher layers of the OSI model. The data link layer may be composed of logical link control and media access control (MAC) sublayers.

Throughout this description, elements appearing in figures are assigned three-digit reference designators, where the most significant digit is the figure number where the element is introduced. An element that is not described in conjunction with a figure may be presumed to have the same characteristics and function as a previously-described element having the same reference designator.

DETAILED DESCRIPTION

Description of Apparatus

Figure 1:
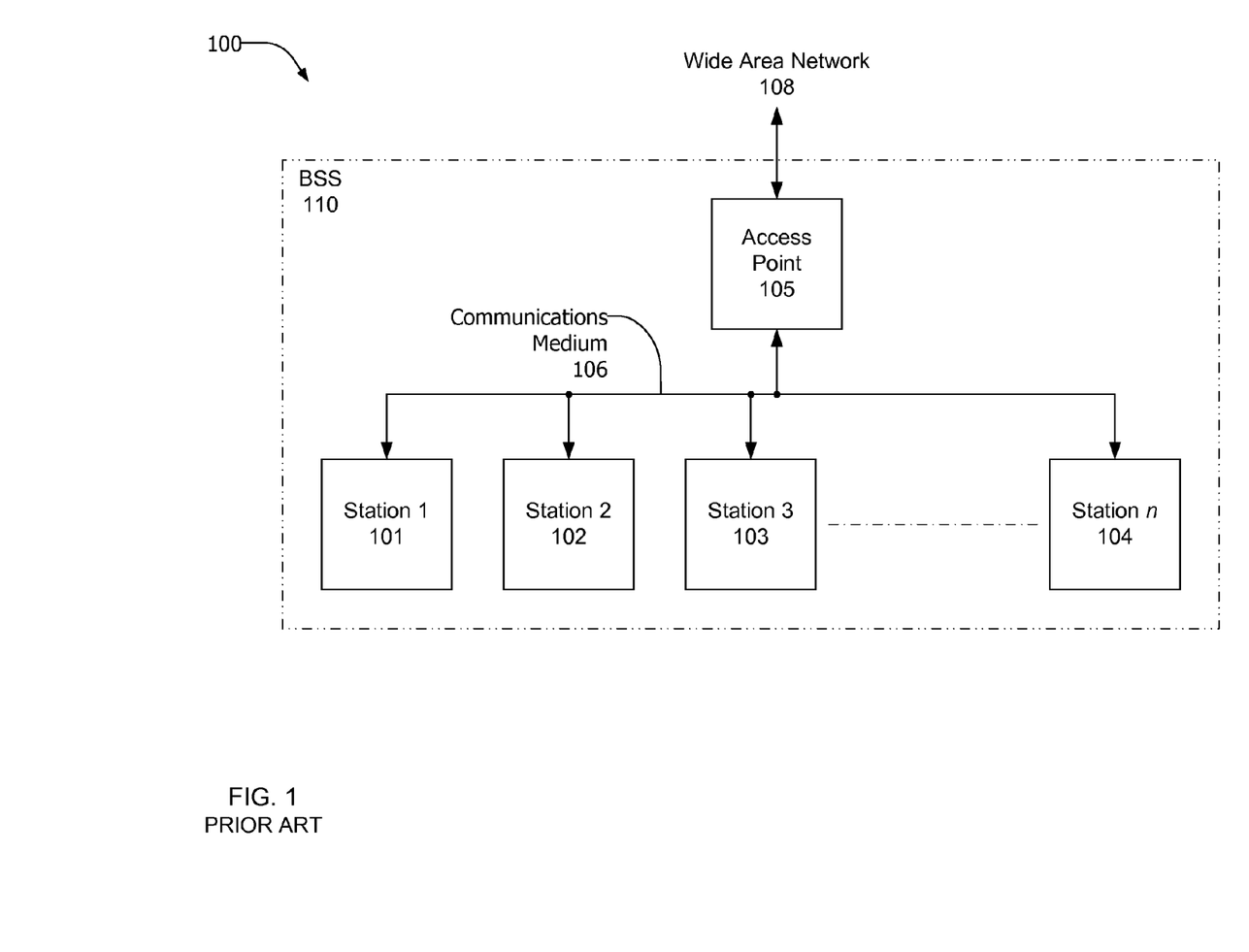
FIG. 1 is a block diagram of a conventional local area network.

Referring now to FIG. 1, a conventional local area network 100 may include an access point 105 and a plurality of stations 101, 102, 103, 104 linked by a communications medium 106. In this context, a "station" is an entity that connects to a single communications medium and has a unique predefined media access (MAC) address. For example, the local area network 100 may be a home network and the communications medium may be radio frequency wireless communications in accordance with the Wi-Fi/IEEE 802.11 protocols. In this case, the access point 105 may be a wireless router that functions as a bridge between the local area network 100 and a wide area network 108. The wide area network 108 may be or include the Internet. The access point 105 may also function as a controller for the local area network 100. The stations 101-104 may be, for example, personal computers, tablet computers, cellular telephones, audio and/or video players, and other Wi-Fi compatible devices. The local area network 100 may include more or fewer than four stations, and the number of stations connected to the local area network may be dynamic.

A local area network may use a communications medium other than Wi-Fi, in which case the local area network may include other types of devices, such as hubs or switches, not shown in FIG. 1.

A simple local area network consisting of an access point and one or more stations communicating wirelessly is termed a "basic service set" or BSS according to the Wi-Fi standards. In this patent, the term "basic service set" is intended to encompass a network or sub-network containing two or more stations communicating via any one physical layer protocol and any communications medium.

Figure 2:
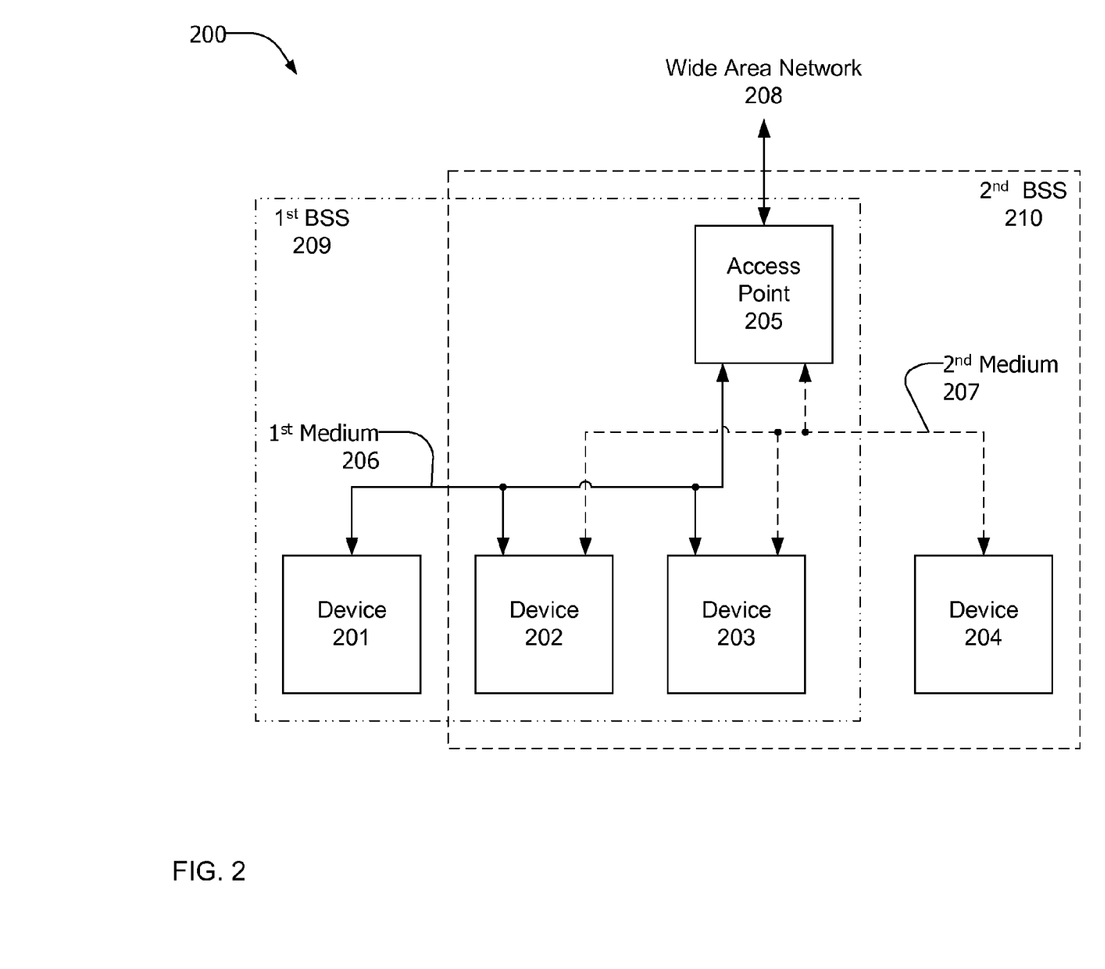
FIG. 2 is a block diagram of an exemplary multi-communications-media network.

Referring now to FIG. 2, an exemplary multi-communications-media network 200 may include an access point 205 and a plurality of devices 201, 202, 203, 204 that communicate with each other via a first communications medium 206 and a second communications medium 207. The term "multi-communications-media" (MCM) refers to two or more different communications media or standards, and must be distinguished from multimedia (i.e. audio/video) communications. Each device may include one or more stations.

An MCM network may include more or fewer than four devices, and more than two communications media. As shown in FIG. 2, an MCM network may include an access point as a bridge to connect the MCM network 200 to the Internet or other wide area network 208. The access point 205 may also function as a network controller. An MCM network need not include an access point or other predetermined network controller, or may include different network controllers of each medium. An MCM network may function as an ad hoc network without a dedicated controller, in which case one of the devices may assume the functions of a network controller. When an access point is present, the access point may connect to one or more communications media within the MCM network.

At least two of the devices and/or an access point in an MCM network may be connected by two or more communications media. In the example of FIG. 2, the access point 205, device 202, and device 203 are connected by both the first communications medium 206 and the second communications medium 204. The access point 205 may communicate with either device 202 or device 203 via the first communications medium 206 or the second communications medium 207, or with both the first communications medium 206 and the second communications medium 207 simultaneously. The first communications medium 206 and the second communications medium 207 may be used simultaneously to increase the bandwidth or the reliability of the communications between two devices. Alternatively, the access point 205 may communicate with, for example, device 202 via the first communications medium 206 and simultaneously communicate with device 203 over the second communications medium 207.

In the example of FIG. 2, device 201 only connects to the first communications medium 206 and device 204 only connects to the second communications medium 207. In this case, any of the access point 205, device 202, and device 203 may act as a bridge to facilitate communications between device 201 and device 204.

Access point 205, device 201, device 202, and device 203 constitute a first BSS 209. Similarly, access point 205, device 202, device 203, and device 204 constitute a second BSS 210. An MCM network may be composed of two or more BSSs.

The second communications medium may be different from the first communications medium. For example, the first communications medium 206 may be Wi-Fi, and the second communications medium may be a wired medium such as PLC, wired Ethernet, and communications superimposed on conventional telephone or cable TV wiring. Other communications media may be used, such as optical fiber and free-space optical communications. The second communications medium may be the same as the first communications medium. For example, the first BSS may be a secure BSS intended for employees or residents of a facility and the second BSS may be a non-secure BSS for use by visitors or quests. In this case, both the first BSS and the second BSS may communicate via a common medium, such as power line communications.

Figure 3:
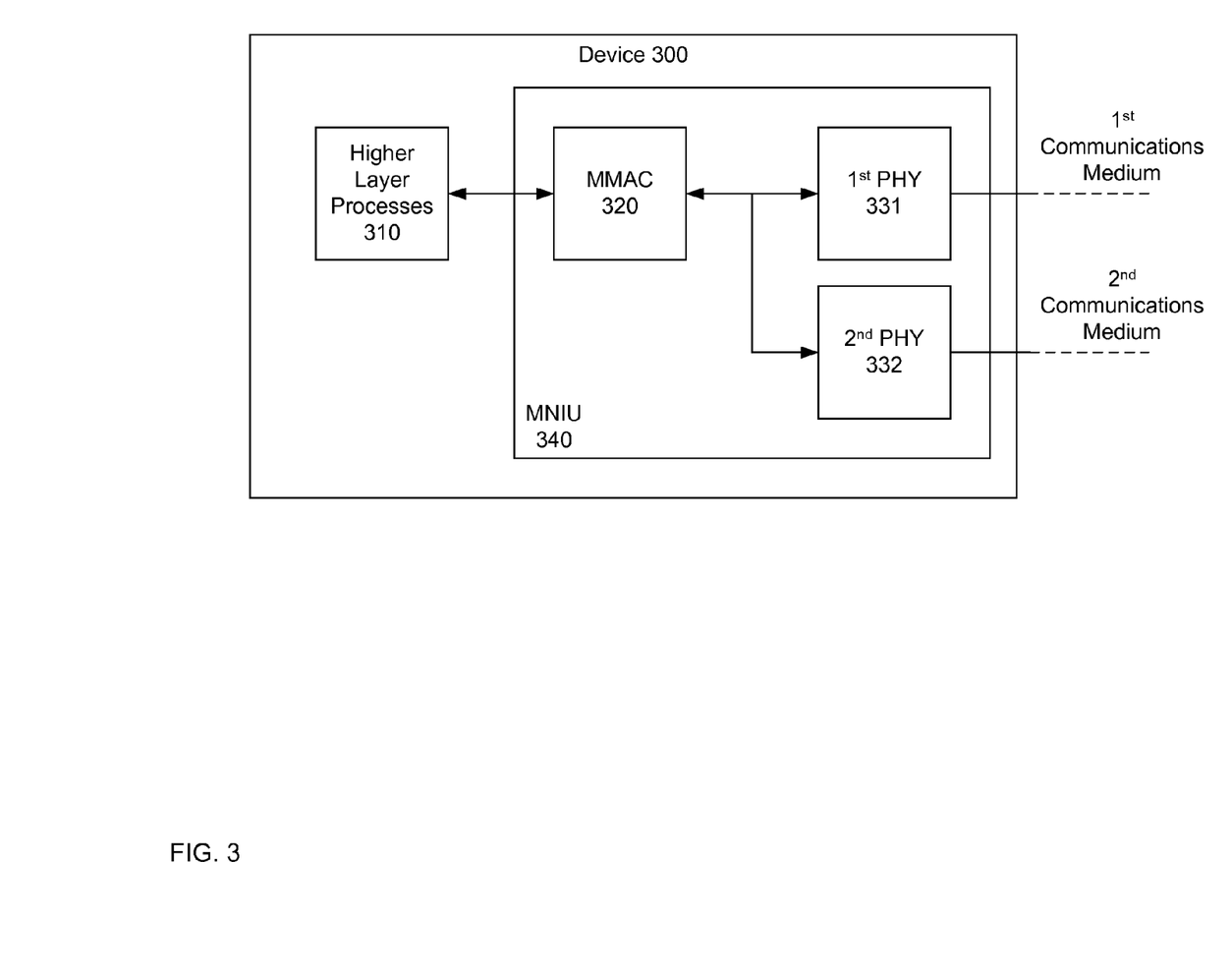
FIG. 3 is a functional block diagram of a device for use on a multi-communications-media network.

Referring now to FIG. 3, a device 300 may be suitable for use as the device 202, the device 203, or the access point 205 of FIG. 2. Functionally, the device 300 may include a first physical interface (PHY) 331 coupled to a first communications medium and a second PHY 332 coupled to a second communications medium. In this patent, the term "coupled" means "connected to and in communications with". A device may include more than two physical interfaces, which may be coupled to two or more communications media.

The device 310 may include a multi-media access controller (MMAC) 320 to interface between higher layer processes 310 and the first and second PHYs 331, 332. In this context, the term "multi-media" refers to more than one communications medium, not multi-media (i.e. audio/video) information content. In some circumstances, the device 300 may function as a bridge between the first and second communications media, in which case the MMAC 320 may provide an interface between the first PHY 331 and the second PHY 332.

The device 300 may include higher layer processes 310. The higher layer processes 310 may include a protocol stack with the Link Control Layer, the Network Layer, and the Transport Layer of the OSI model, as well as various application programs.

The first PHY 331 and the first communications medium may collectively form the physical layer of a first communications protocol. Similarly, the second PHY 332 and the second communications medium may collectively form the physical layer of a second communications protocol different from the first communications protocol. Functions performed by the first PHY 331 and the second PHY 332 may include conversion of data into electrical, optical, or radio frequency signals or waveforms for transmission via the respective communications media, and conversion of electrical, optical, or radio frequency signals or waveforms received via the respective communications medium into data. Where required by the respective communications protocol, the first PHY 331 and/or the second PHY 332 may perform other functions such as coding, clock recovery, interleaving, frame synchronization, flow control, carrier sensing, collision detecting, error detection and/or correction, filtering, equalization and other signal processing functions.

Media Access Control is a sub-layer of the Data Link Layer within the OSI seven-layer model. The term "MAC" is commonly used to describe both the processes of the Media Access Control layer and the hardware/software/firmware that implements those processes. The MAC provides addressing and access control mechanisms, and serves as the interface between the physical layer and higher layer processes 310. A MAC is typically assigned a unique MAC address, which may also be called a physical address or a hardware address. Typically, the MAC address is assigned at the time of manufacture and is embedded in the hardware or unalterable firmware within a network device such as the device 300.

In the device 300, the MMAC 320 may perform media access control functions for both the first PHY 331 and the second PHY 331. The MMAC 320 may be assigned a single MAC address. The MMAC 320 may associate a single MAC address with one PHY and one BSS at any given time. The MMAC 320 may move the association of the MAC address to different PHYs. In this case, the device 300 may be considered as a single station capable of migrating between two or more BSSs.

An MMAC may be assigned different MAC addresses for each of two or more PHYs within a device. For example, the MMAC 320 of FIG. 3 may be assigned a first MAC address associated with the first PHY 331 and a second MAC address associated with the second PHY 332. In this case, the device 300 may be considered as two stations, each of which is associated with a different BSS.

The MMAC 320 may provide a unified interface between the higher layer processes 310 of the device 300 and the first and second PHYs 331, 332. Additionally, the MMAC 320 may perform addressing and channel access control functions for both the first PHY 331 and the second PHY 332. The MMAC 320 may be logically opaque, such that the first and second PHYs 331, 332 may not be visible to the higher layer processes 310. In this case, the higher layer processes may be unaware of which of the first and second PHYs 331, 332 is used for any particular communications and may even be unaware of the existence of two PHYs. The MMAC 320 may be transparent such that the higher layer processes 310 are aware of the presence of multiple PHYs. In this case, the higher layer processes 310 may control or participate in selecting which of multiple PHYs is used for particular communications.

For example, the MMAC 320 may appear as a conventional Wi-Fi MAC to the higher layer processes 310. In this case the higher layer processes may implement the Link Control, Network Layer, and Transport Layers of a Wi-Fi protocol stack. The first PHY 331 may be, or be functionally equivalent to, a conventional Wi-Fi PHY. The second PHY 332 may be similar to a conventional Wi-Fi PHY with the substantial exception that the second PHY 332 may transmit and receive data over a wired connection instead of modulated onto a radio frequency carrier signal. To this end, the second PHY 332 may use signaling, modulation, and interference abatement procedures similar to those of conventional wired networks. Framing, bandwidth allocation, flow control, contention and other characteristics of communications via the second PHY may be the same as or adapted from a Wi-Fi protocol.

A communications protocol that provides communications capabilities similar to Wi-Fi via a wired communications medium will be referred to herein as "Wired-Wi-Fi" (WWF). The WWF protocol may be substantially the same as the Wi-Fi protocol except for the physical layer. A PHY that provides communications capabilities similar to Wi-Fi via a wired communications medium will be referred to herein as a "WWF PHY". Similarly, a MAC that appears to be a Wi-Fi MAC to higher layer processes, but interfaces with a WWF PHY, will be termed a "WWF MAC".

For example, a WWF PHY may be adapted for power line communications (PLC). However, a PLC WWF protocol and a PLC WWF PHY may be incompatible with legacy PLC standards. For example, the security system used on Wi-Fi networks, which is called Robust Security Network (RSN) or Wi-Fi Protected Access 2 (WPA2), is superior to the security systems available on legacy PLC networks. Thus a WWF protocol may incorporate RSN to provide enhanced security and directly interoperable between a WWF BSS and a Wi-Fi BSS within an MCM network. An MMAC may transfer the same encrypted frames between media, so that the wireless Wi-Fi BSS and the wired WWF BSS become one logic network. This enables WWF compatible devices and Wi-Fi compatible devices to exchange encrypted data and control frames without any intermediate decryption/re-encryption transitions.

In some circumstances, two or more PLC networks using different standards may need to use the same power line wiring. Unfortunately, the various standard PLC technologies use incompatible PHYs, so they cannot even read each others' transmissions. The IEEE and ITU standards for PLC networks, consequently, include a coexistence mechanism that allows stations that are blind to each others' transmissions at least to share the medium in separate time slots. During a time slot that is used by one PLC technology, all of the stations of other PLC technologies must cease transmission.

Thus, in some circumstances, a PLC WWF BSS may be forced to remain silent for relatively long periods of time (milliseconds), endangering not only the overall throughput available, but also the ability for the technology to support such time-critical operations as Voice over IP and broadcast TV. However, during these blackout coexistence periods, an MMAC may switch communications from the PLC WWF BSS to a Wi-Fi BSS.

The MMAC 320, the first PHY 331 and the second PHY 332 collectively form a multiplex network interface unit (MNIU) 340. Within this description, the term "unit" means a collection of hardware, which may be augmented by firmware and/or software, which performs the described functions. A "multiplex network interface unit" provides a uniform interface between higher layer processes and plurality of communications media.

The depiction in FIG. 3 of the device 300 as a set of functional elements does not imply any corresponding physical separation or demarcation. All or portions of one or more functional elements, including the MNIU 340, may be collocated within a common programmable circuit device or application specific integrated circuit. Any of the functional elements may be divided between two or more circuit devices. The higher layer processes 310 may be implemented partially or wholly by software executed by one or more processors. The MMAC 320 may be implemented in hardware or by a combination of hardware and software executing on one or more processors. The MMAC 320 may be implemented wholly or in part by software executing on a processor that also executes some or all of the higher layer processes. The first PHY 331 and the second PHY 332 may be implemented primarily in hardware, which may be augmented by software and/or firmware. Digital baseband portions of the first PHY 331 and the second PHY 332 may be implemented in a common integrated circuit chip, which may also include all or portions of the MMAC 320. The "digital baseband portion" may exclude analog and RF circuits and components required to couple digital information onto the respective communications medium.

A device, such as the device 300, may include additional elements not shown in FIG. 3 including, for example, memory, storage, a display, audio components such as speakers and a microphone, and/or user interface components such as a touch screen, keypad, keyboard, or mouse.

Figure 4:
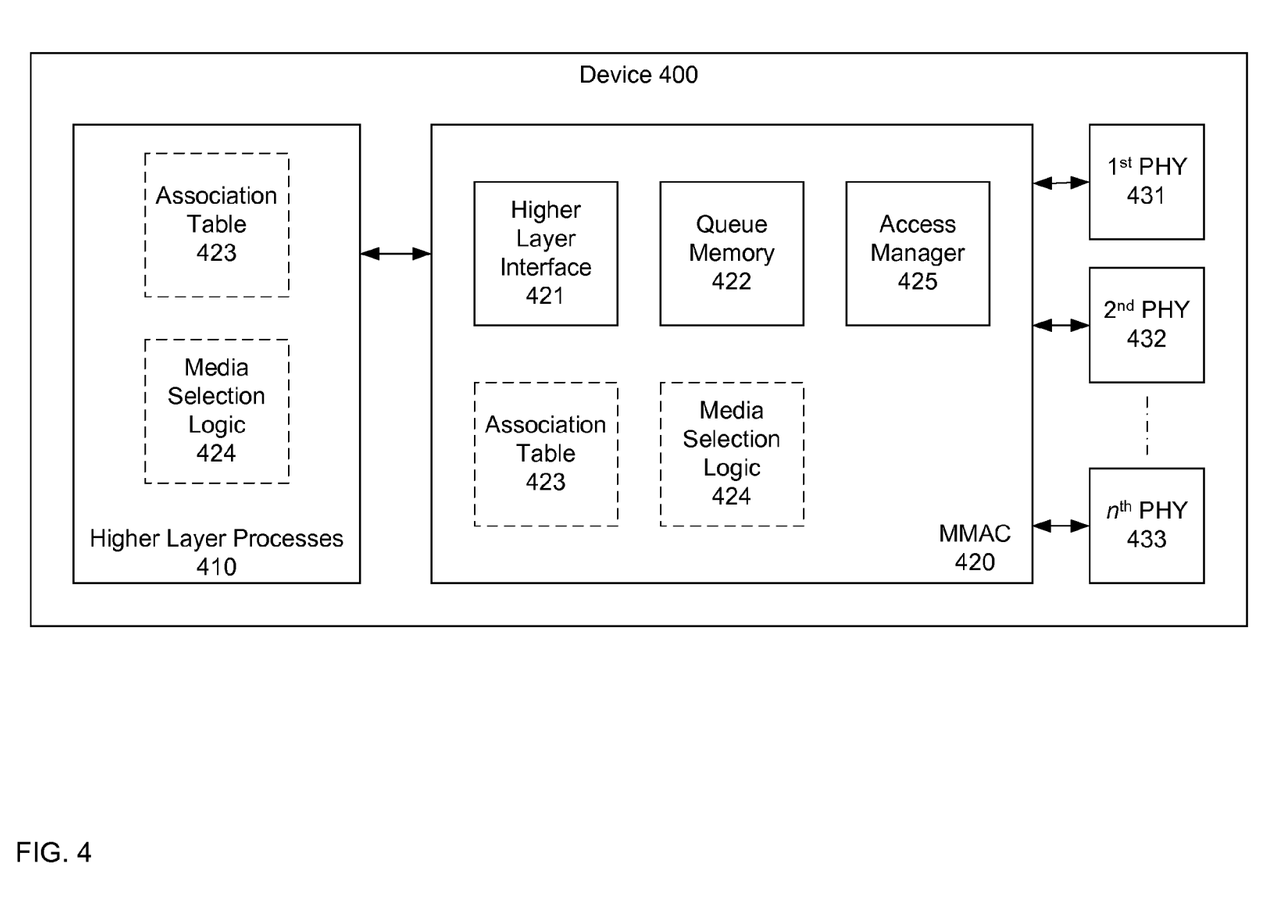
FIG. 4 is a more detailed functional block diagram of a device for use on a multi-communications-media network.

Referring now to FIG. 4, a device 400, which may be the device 300, may be suitable for use on an MCM network. The device 400 may include higher layer processes 410, an MMAC 420, and n PHYs (431, 432, 433), where n is an integer greater than one. The MMAC 420 may include a high layer interface 421, a queue memory 422, and an access manager 425. The MMAC 420 may interface with the n PHYs. The device may include an association table 423 and media selection logic 424. The association table 423 and media selection logic 424 may be contained within the MMAC 420. The association table 423 and media selection logic 424 may be contained within the higher layer processes 410. The association table 423 and media selection logic 423 may be distributed within the higher layer processes 410 and the MMAC 420.

Each of the n PHYs 431-433 coupled to the MMAC 420 may be associated with a respective one of a corresponding plurality of BSSs. For example, the first PHY 431 may be coupled to a wireless Wi-Fi BSS and the second PHY 432 may be coupled to a wired BSS such as a WWF PLC BSS. The MMAC 420 may effectively merge the wireless and wired BSSs into a single network which uses the same operational protocols independent of the medium used for any specific communication. The merged network may use the same security protocols and system such that wired and wireless devices may communicate securely without requiring processing-intensive decryption and re-encryption when frames pass between the BSSs. Similarly, the merged network may use the same QoS system for all BSSs, so that the same quality guarantees can be extended across both wired and wireless media. The merged network may allow common MAC-level control messaging between devices on different BSSs. The MMAC 420 may present a unified, media independent, interface to the higher layer processes.

The MMAC 420 may have a single MAC address. A single MAC address could, in theory, be associated with multiple BSSs. However associating a single MAC address with multiple BSSs greatly complicates security and addressing in an MCM network. Thus a single MAC address should be associated with only one PHY and the corresponding BSS at any time. However, the MMAC 420 may be free to "roam" from one BSS to another. For example, an MMAC having a single MAC address may be normally associated with a first BSS, but may change association to a second BSS, for example, if communications via the first BSS were impaired, or if communications with a specific target device were only possible via the second BSS.

The MMAC 420 may have a plurality of MAC addresses corresponding to the plurality of PHYs coupled to the MMAC. Each of the plurality of MAC addresses may be associated with a respective BSS. In this case, the MMAC 420 may communicate via two or more BSSs simultaneously, with the same or different devices. Further, any device having an MMAC may provide bridging/repeating capabilities between different BSSs, and device-to-device links may be set up across two or more BSSs using a single control message exchange.

The MMAC 420 may be implemented in hardware, by software executing on one or more processors, or by a combination of hardware and software. When the MMAC is implemented as a hardware chip separate from the hardware that implements the higher layer processes, the high layer interface 421 may exchange data and control information with the higher layer processes through a standard hardware interface such as a PCI (peripheral component interface) or PCI Express bus, an SDIO (secure data input/output) bus, an SPI (serial peripheral interface) bus, an EBI (external bus interface) bus, or some other hardware interface. When the MMAC is implemented, at least in part, by software executing on a processor that also executes some or all higher layer processes, the MMAC may interface with the higher layer processes, for example, via shared memory and function calls.

Data frames received via the higher layer interface 421 may be stored in the queue memory 422. To support Quality of Service (QoS) requirements, the queue memory 422 may include multiple queues to store frames that have been assigned priorities by the higher layer processes. The queue memory 422 may include four or more priority queues to store frames having corresponding priority levels. When the MMAC 420 is assigned a single MAC address that is associated with a single BSS at any time, a bank of priority queues may be allocated to the currently-associated BSS.

When the MMAC 420 is assigned different MAC addresses for each communications medium or PHY coupled to the MMAC 420, the queue memory 422 may include separate banks of priority queues associated with each PHY. For example, a WWF MMAC coupled to a Wi-Fi PHY and a WWF PHY may be assigned two MAC addresses and may contain two banks of priority queues, each bank containing four or more queues for a corresponding number of priority levels. The contents of each queue may be all frames that have a specific priority, independent of the destination devices of each frame. When a frame in any priority queue is ready for transmission, the MMAC 420 may contend for the corresponding communications medium via the corresponding PHY and, when the MMAC 420 gains access, cause the PHY to transmit the frame. When frames are ready for transmission in two or more priority queues for a single medium, the frame from the highest priority queue may be transmitted first.

The queue memory 422 may also include one or more queues for streams that have been granted a specific bandwidth allocation by the access point or other controller for a BSS. Such streams may include, for example, a video stream from a source (media player, cable TV receiver, etc.) to a display device. Queues for such streams may be set up dynamically. Each stream may receive a fixed portion of the BSS bandwidth, such as a recurring time slot. When the allocated time slot arrives, the MMAC 420 may transmit as many frames as fit within the duration of the time slot.

The queue memory 422 may also include one or more queues for received frames awaiting transfer to the higher layer processes 410.

When each of the n PHYs 431-433 coupled to the MMAC 420 is associated with a different BSS, the device 400 must keep track of which destination MAC addresses are accessible via which PHY. To this end, the MMAC 420 may maintain an association table 423 listing every destination MAC address to which the MMAC 420 has successfully transmitted a frame. The association table 423 may associate each listed destination MAC address with a PHY used for communication with the destination address. Further, the association table 423 may, where appropriate, associate at least some destination MAC addresses with additional MAC addresses that can be used for communication with the same destination device via other BSSs.

When a higher layer process instructs the MMAC 420 to communicate with a specific destination MAC address, the media selection logic 424 may consult the association table 423 to determine which PHY to use for the requested communications. In selecting a PHY, the media selection logic 424 selects both a PHY coupled to the MMAC 420 and the communications medium and BSS associated with the selected PHY. In a first case, the association table 423 includes an association between the specific destination MAC address and a specific PHY, but does not associate the specific destination MAC address with any other MAC addresses for the same destination device. In the first case, the media selection logic 424 may cause the access manager 435 to communicate via the specific PHY.

In a second case, the association table 423 does not include the specific destination address, indicating that the MMAC 420 has not previously communicated with the destination device. In this case, the media selection logic 424 may experimentally determine which PHY is used to communicate with the specific destination. For example, the media selection logic 424 may cause the access manager 425 to send a frame to the specific destination MAC address via a first PHY, and then wait to see if the transmitted frame is acknowledged. The transmitted frame may be held in a holding queue, within the queue memory 422, reserved for frames to be transmitted to an as yet unknown destination. If the transmitted frame is not acknowledged, the media selection logic 424 may cause the access manager 425 to transmit the frame via a different PHY. This process may be continued until the transmitted frame is acknowledged or until transmission via all possible PHYs has been attempted.

When the transmitted frame is acknowledged, the frame may be removed from the holding queue and the appropriate association of destination MAC address and PHY may be entered into the association table 423. The media selection logic 424 may cause the access manager 435 to send a request frame to the destination MAC address to determine if there are other MAC addresses assigned to the same destination device. The destination device may respond with a response frame indicating additional MAC addresses, if any. This information may also be added to the association table 423.

In a third case, the association table 423 defines an association between the specific destination MAC address and a specific PHY and also associates the specific destination MAC address with one or more alternative MAC addresses for the same destination device. In this case, there are two or more communications paths via two or more BSSs from the device 400 and the destination devices. The media selection logic 424 may instruct the access manager 435 to communicate via the specific PHY or via a PHY associated with one of the alternative MAC addresses for the same destination device. In this case, the media selection logic may select the best BSS for each and every frame at each time of transmission based on the condition of the BSSs associated with the candidate PHYs. The "best BSS" may be selected on the basis of the expected delay time in the queues associated with each alternative BSS, or on the historical number of retries required on each BSS, or some other criteria. For example, the media selection logic 424 may select a PHY other than the specific PHY if the BSS associated with the specific PHY is congested or otherwise impaired. For further example, the media selection logic 424 may select the PHY that requires the minimum power to communicate with the destination device. When the device 400 makes an unsuccessful attempt to communicate with a destination device via a selected BSS, the device 400 may automatically attempt communication via an alternative BSS associated with the same destination device.

In some cases, a stream may require in-order delivery, which is to say that the frames constituting the stream must be transmitted and delivered in a predetermined order. However, it may be impractical to guarantee in-order delivery if the frames of the stream are sent over two different BSSs. Consequently, an in-order stream may be delivered over a single BSS selected when transmission of the stream is initiated.

The device 400 may send request frames to other devices periodically to determine if the associations listed in the association table have persisted. When the device 400 discovers that a previously included association no longer exists, the association table 423 may be updated accordingly.

The access manager 425 may, in response to requests from the media selection logic 424, gain access to one or more BSSs via the corresponding PHYs. When access is gained, the access manager 435 may transfer frames for transmission from the appropriate queues in the queue memory 432 to the PHYs. The access manager 425 may also transfer frames received from the PHYs directly to the higher layer processes or to one or more received frame queues in the queue memory 422.

When the MMAC 420 has a single MAC address, frames received via the plurality of PHYs will all be addressed to the same MAC address. The MMAC 420 may also be configured to detect when two or more different PHYs have received the same frame and to dismiss duplicate frames.

Some devices in an MCM network (for example devices 201 and 204 in FIG. 2) may be coupled only to a single communications medium and a single BSS. Such devices may be similar to the device 400 with only a single PHY. In this case, the device need not include an association table and media selection logic. For example, a protocol stack within the higher layer processes 410 and the MMAC 420 may be in accordance with a Wi-Fi protocol, but the $1^{st}$ PHY may be configured to couple to a wired communications medium.

Description of Processes

Figure 5A:
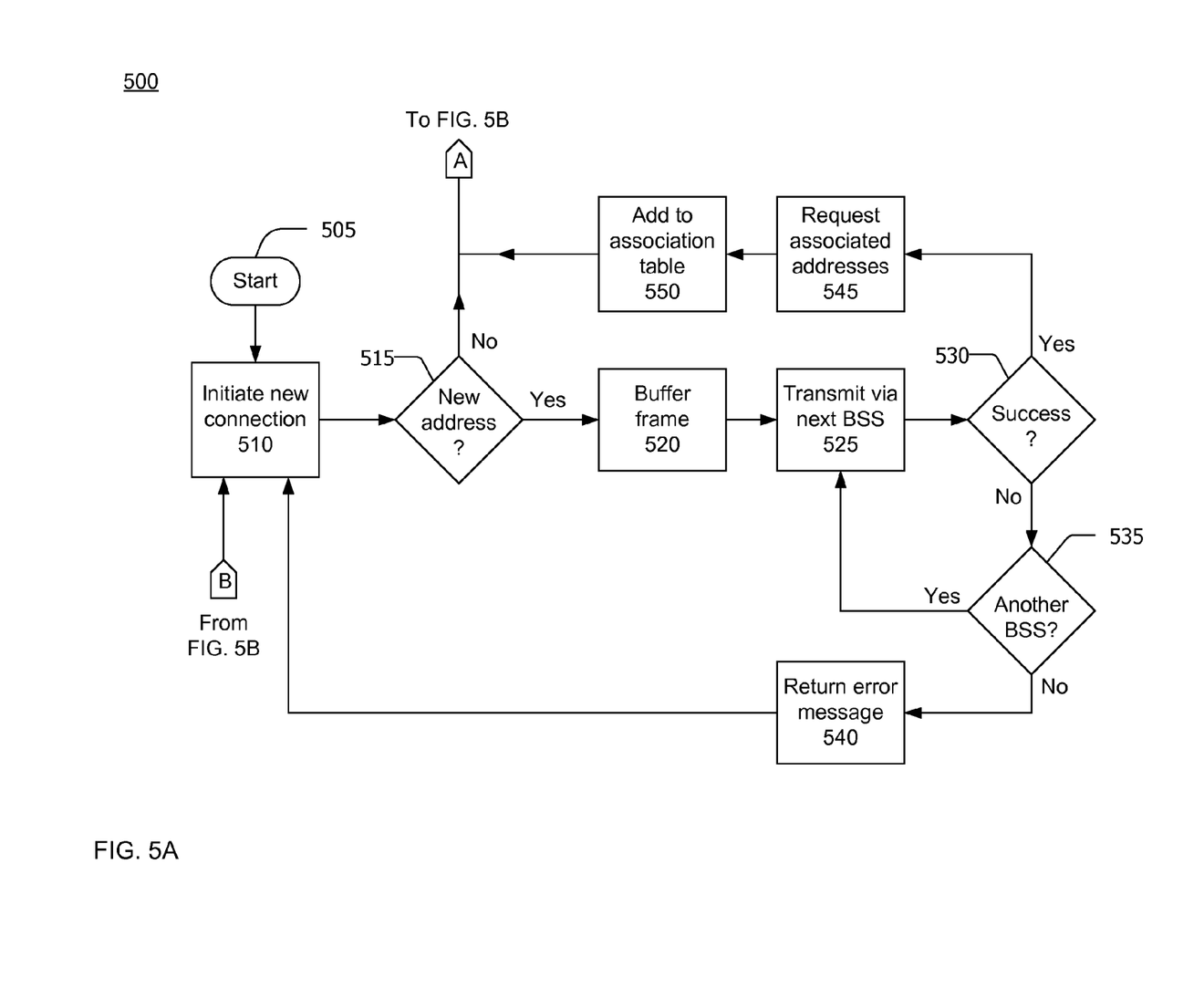
FIG. 5A and FIG. 5B collectively show a flow chart of a process for operation of a multiplex media access controller.
Figure 5B:
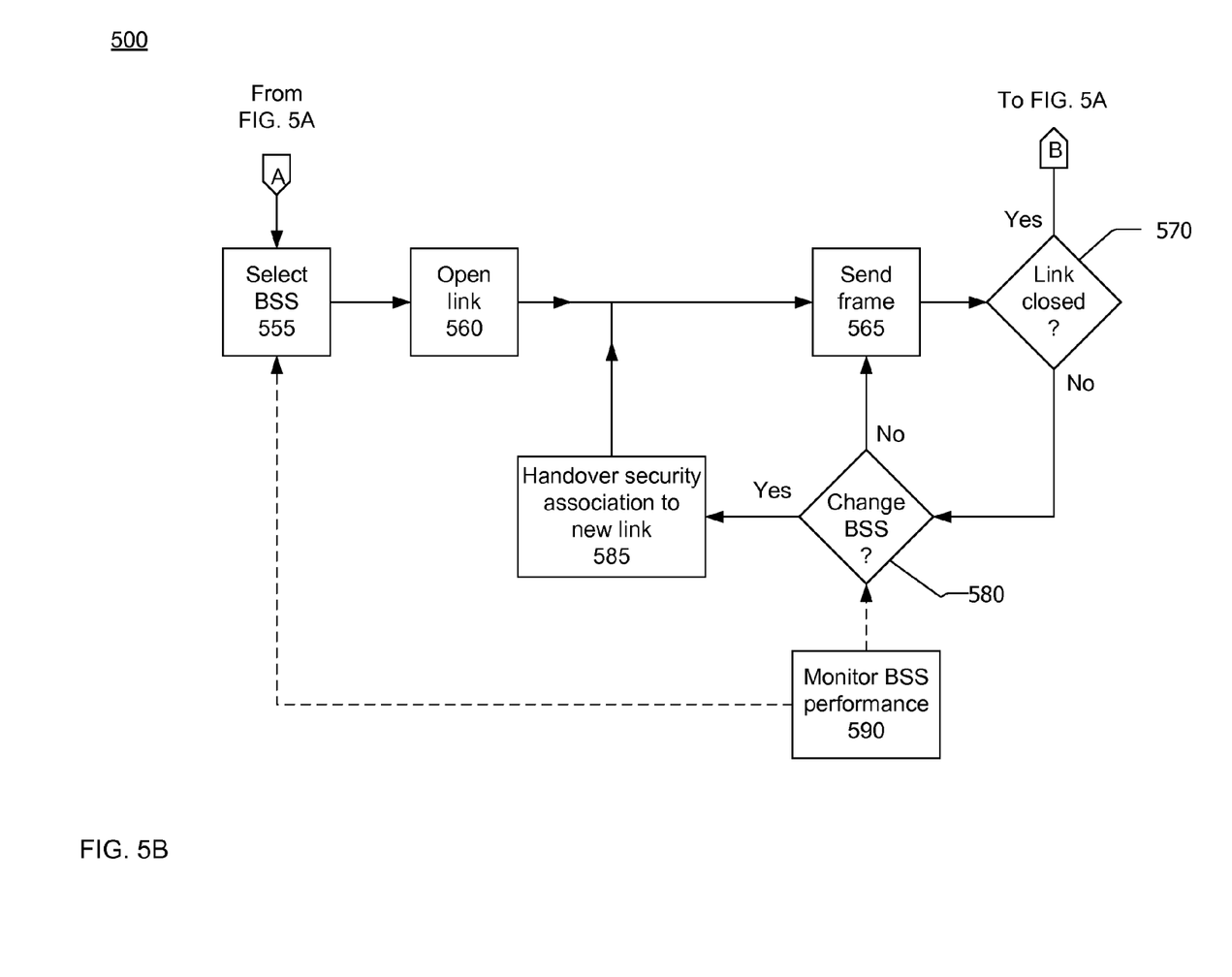

FIG. 5A and FIG. 5B provide a flow chart of a process 500 that may be performed by a device, such as the device 400, to create and use a persistent communications link over a MCM network. The device may be part of two or more BSSs, which is to say that the device includes two or more PHYs coupled to a respective number of communications media. The process 500 may start at 505, for example when two or more devices are coupled to the MCM network. The process 500 may continue cyclically until the network is decommissioned. Multiple instances of the process 500 may run concurrently to establish and use a plurality of links through the same MCM network.

Referring first to FIG. 5A, at 510 the device may initiate opening a communication link with a target device via the MCM network. For example, an application program operating in the device may send an instruction to a protocol stack to open communications with a target device. The protocol stack may determine a target MAC address identifying the target device. At 515, the device may determine if the target MAC address is a new address or a known address (i.e. an address to which the device has previously sent one or more frames). When a determination is made at 515 that the target MAC address is known (not new), the process 500 may continue as shown in FIG. 5B.

When a determination is made at 515 that the target MAC address is a new address, media selection logic within the device may undertake a discovery process to determine which BSS, and which PHY, may be used to communicate with the target MAC address. A trial frame to be sent to the target device may be stored in a buffer memory at 520, and then transmitted, using the target MAC address, via a first BSS at 525. At 530, a determination may be made if the transmission to the target device was successful. This determination may be made, for example by waiting for a predetermined time period for the target device to acknowledge receiving the trial frame.

When a determination is made at 530 that the transmission was not successful (i.e. an acknowledgement message is not received), the media selection logic may determine at 535 if another BSS is available. In another BSS is available, the trial frame may be retrieved from the buffer memory and transmitted via another BSS at 525. The actions at 525 to 535 may be repeated cyclically until the trial frame is successfully transmitted to the target device, or until all available BSSs have been tried. When the trial frame has been transmitted at least once over all of the available BSSs, an error message may be returned to the application program at 540 and the process 500 may return to 510 to await another instruction.

When a determination is made at 530 that the trial frame has been successfully transmitted to the target destination (i.e. an acknowledgement message is received), the media selection logic may send a request message to the target device (via the BSS used to successfully transmit the trial frame) to determine what other MAC addresses are collocated with the target MAC address at the target device. The target device may provide a response indicating what additional MAC addresses, if any, are located at the target device. At 550, the target device's MAC address and associated BSSs may then be added to an association table, such as the association table 423. The process 500 may then continue as shown in FIG. 5B.

At 555, the device may consult its association table and select which BSS, and thus which PHY, will be used to establish a link to the target device. Of course, if the association table indicates that only one BSS may be used for communication with the target device, then that BSS must be selected by default. When the association table indicates that two or more alternative BSSs can be used to communicate with the target device, one BSS may be selected at 555. The selection may be based on one or more criteria such as the relative delays in queues for the alternative BSSs, the noise or interference present on each BSS, the available bandwidth or transmission rate on each BSS, the power required for successful transmission to the destination device via each BSS, and/or factors relating to the quality of service available over each BSS, such as a number of retries required for each BSS. To assist in selecting a BSS for each link to be opened, the device may continuously monitor the performance of the available BSSs at 590.

A link between the device and the target device via the selected BSS may be established or opened at 560. Opening the link may involve at least a handshake exchange of messages between the device and the target device. Opening the link may commonly involve establishing a security association between the device and the target device in accordance with the RSN protocol. Establishing a security association may include, for example, exchanging certificate information and/or encryption keys.

A 565, at least one frame may be sent to the target device via the link opened at 560. At 570, a determination may be made if the previously transmitted frame closed the link, or if the link has been closed by some other action. If the link is closed, the process 500 may return to action 510 (FIG. 5A) to await another instruction.

If a determination is made at 570 that the link has not been closed, a determination may be made at 580 if the link should be moved to another BSS. The determination at 580 whether or not to change BSSs may be made using similar criteria as used to select an initial BSS at 555. If the destination device for the link can only be reached by one BSS, a decision to use the same link is made at 580 by default. Additionally, if the link carries a traffic stream that requires in-order delivery, a decision to use the same link may be automatic at 580.

When a determination is made at 580 to move the link to a new BSS, a new link via the new BSS may be opened at 585. Opening the new link may include handing over a security association from the previous BSS to the new BSS.

If a source device and a destination device are both members of two or more BSSs, the source and destination devices are connected by two or more different media. In this case, the amount of energy required to transmit a frame between the source and destination devices will usually be different for the two BSSs. At 555, a device may select among alternative BSSs according to the energy that must be expended to transmit each frame. The device may lower overall energy consumption by selecting the BSS that requires the least amount of energy.

Figure 6:
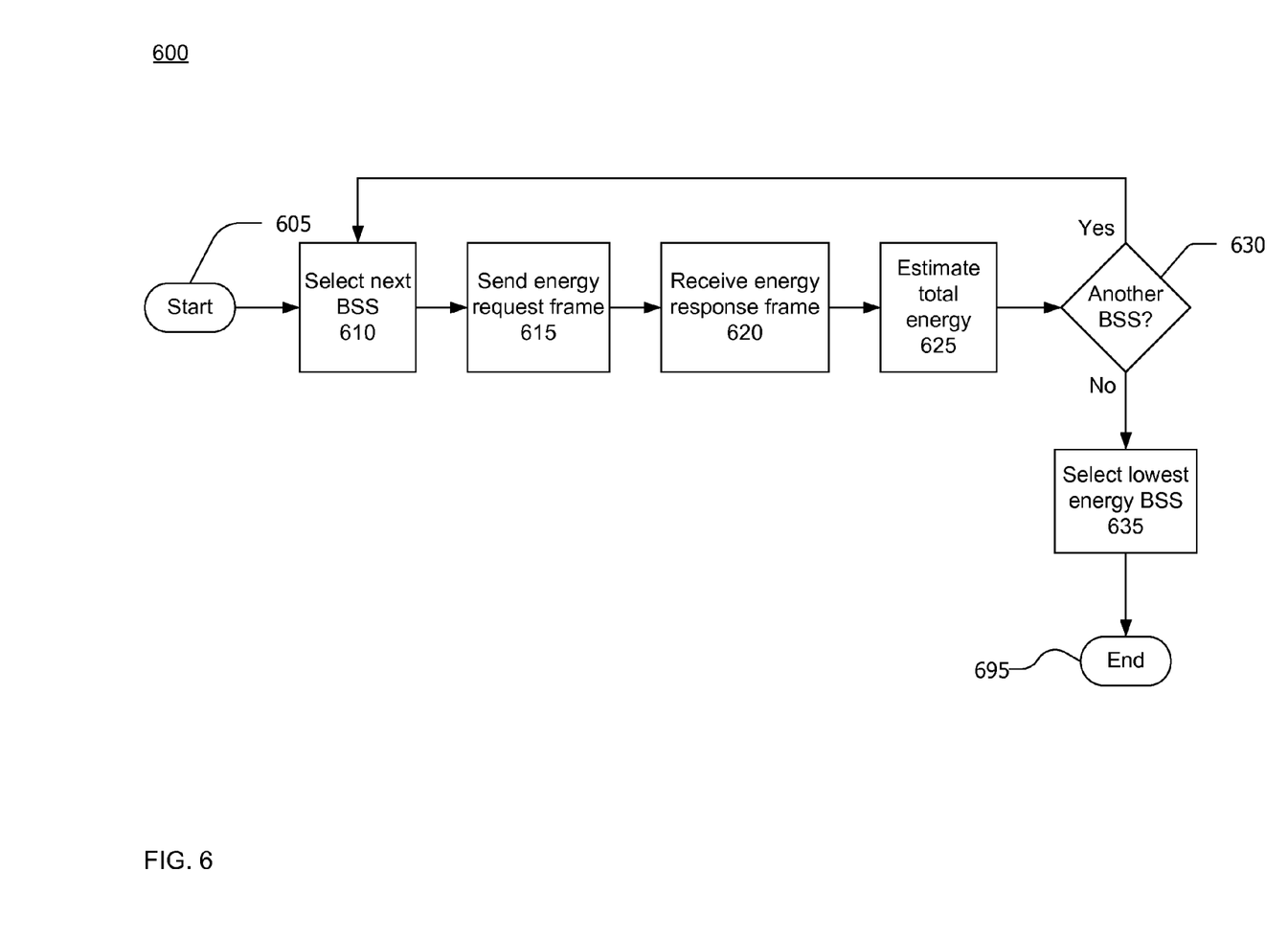
FIG. 6 is a flow chart of a process for selecting a basic service set in a multi-communications-media network.

Referring now to FIG. 6, a process 600 for energy-based BSS selection may be performed at 555 and/or 580 within the process 500. The process 600 may be performed periodically as part of monitoring BSS performance at 590 within the process 500. The process 600 may start at 605 and end at 695.

At 610, one BSS may be selected from two or more alternative BSSs linking a source and target device. At 615, an energy request frame may be transmitted via the selected BSS. An energy request frame is a unicast frame transmitted to the target device. The energy request frame may be a dedicated message frame or a modified data frame containing actual payload data. The source device may record its own energy usage during the transmission of the energy request frame.

At 620, an energy response frame may be received from the target device via the BSS selected at 610. The energy response frame may include a field containing an estimate of the amount of energy required for the target device to transmit the energy response frame back to the source device. The energy response frame may be a dedicated message. The energy response frame may be a modified Acknowledgement (ACK) frame, such as a modified Wi-Fi ACK frame, that includes a field containing the energy estimate. An energy response frame may only be transmitted in response to an energy request frame.

At 625, the MNIU may estimate the total energy required for a round-trip communication via the selected BSS with a known payload size. The MNIU may add its own energy required at 610 to the energy estimate contained in the energy response frame received at 620.

At 630, a determination may be made if energy estimates have been made for all alternative BSSs. The actions from 610 to 630 may be repeated cyclically until energy estimates have been obtained for all BSSs. When all estimates have been obtained ("no" at 630), the BSS requiring the lowest energy may be selected at 635. Future communications between the source device and the target device may be made via the lowest energy BSS.

In some circumstances, a source device and a destination device cannot communicate via a single BSS. The source and destination devices may not be members of a common BSS, or the source and destination devices may be members of a BSS that is damaged, impaired, or otherwise unavailable. In this case, communications between the source and destination devices may be effected using one or more intermediate devices to relay frames and/or to bridge frames between different BSSs. The source and destination devices may be connected by two or more different paths, each of which passes through one or more intermediate devices. In this case, the amount of energy required to transmit a frame between the source and destination devices will usually be different for the different paths.

Figure 7:
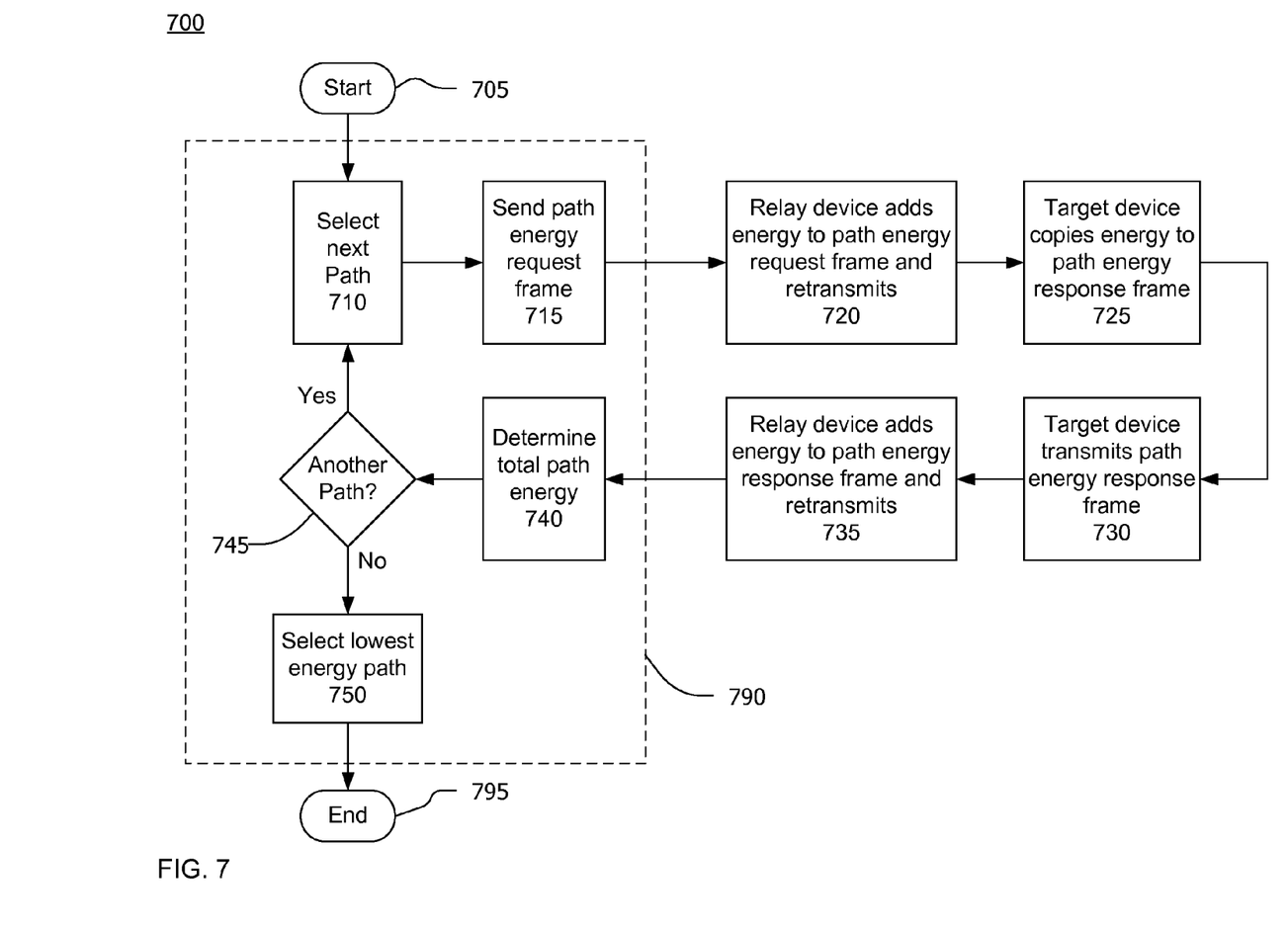
FIG. 7 is a flow chart of a process for selecting a path in a multi-communications-media network.

Referring now to FIG. 7, a process 700 for energy-based path selection may be performed at 555 and/or 580 within the process 500. The process 700 may be performed periodically as part of monitoring BSS performance at 590 within the process 700. The process 700 may start at 705 and end at 795. The portion of the process 700 within the dashed rectangle may be performed by the source device; other actions may be performed by relay and target devices, as indicated.

At 710, one path may be selected from two or more alternative paths connecting a source device and a target device. At 715, a path energy request frame may be transmitted via the selected path. A path energy request frame is a unicast frame transmitted to the destination device. The path energy request frame may be a dedicated message frame or a modified data frame containing actual payload data. The path energy request frame may contain a field indicating the cumulative energy required to deliver the frame. The source device may record its own energy usage in the cumulative energy field of the path energy request frame.

At 720, a relay device along the path may receive and retransmit the path energy request frame. Prior to retransmitting the energy request frame, the relay device may add its estimated energy consumption to the cumulative energy field of the path energy request frame. The action at 720 may be repeated for each relay device along the path.

At 725, the target device may receive the path energy request frame. The target device may copy the cumulative energy field (which now indicates the total energy used to deliver the path energy request frame to its destination) into a path energy response frame. The path energy response frame may include a single field for cumulative round-trip energy, or may contain a field for the cumulative energy to deliver the path energy request frame and a separate field for the cumulative energy to deliver the path energy response frame.

At 730, the target device may add its energy consumption to the energy response frame and transmit the path energy response frame back to the source device.

At 735, a relay device along the path may receive and retransmit the path energy response frame. Prior to retransmitting the path energy response frame, the relay device may add its estimated energy consumption to the cumulative energy field of the path energy response frame. The action at 720 may be repeated for each relay device along the path.

At 740, the source device may receive the path energy response frame and determine the total energy required for a round-trip communication via the selected path with a known payload size.

At 745, a determination may be made if energy estimates have been made for all alternative paths connecting the source and target devices. The actions from 710 to 745 may be repeated cyclically until energy estimates have been obtained for all paths. When all estimates have been obtained ("no" at 745), the path requiring the lowest energy may be selected at 750. Future communications between the source device and the target device may be made via the lowest energy path.

The strengths of signals sent over wireless and wired media, such as Wi-Fi and powerline networks, decreases as a function of distance from the transmission source. In some circumstances, this phenomenon can be used to allow two communication links to use the same medium simultaneously. For example, if two source devices are close to their respective destination devices, but the two source-destination device pairs are distant from each other, the two pairs of devices may be able to communicate simultaneously over the same medium without interfering with each other. The simultaneous successful transmission on a single medium by two source devices will be termed "media reuse" within this patent. Media reuse may be facilitated if each of the source devices transmits at the minimum power level required for reliable communications with its respective destination device, in order to minimize interference at other distant source-destination pairs.

Figure 8:
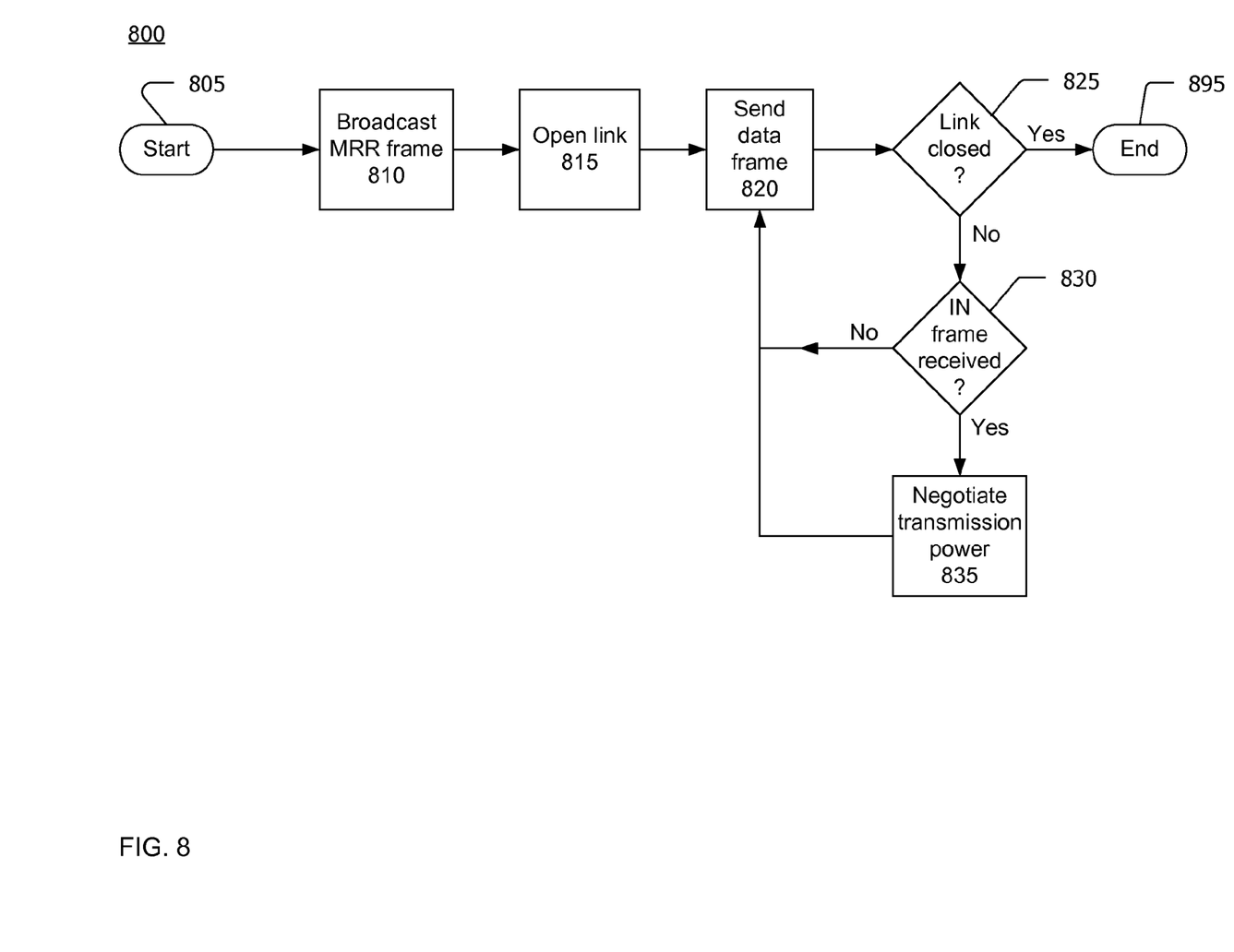
FIG. 8 is a flow chart of a process for media sharing in a multi-communications-media network.

Referring now to FIG. 8, a process 800 provides a mechanism for devices within a BSS to negotiate media reuse. FIG. 8 shows actions that are performed by a single source device. However, the media reuse mechanism is distributed and depends on the interworking of two or more devices. The process 800 may start at 805 when the source device recognizes a required to open a link to a destination device. The process 800 may end at 895 after the link to the destination device is closed.

At 810, the source device may broadcast a media reuse registration (MRR) frame to all devices on a BSS. The MRR frame identifies the source device and indicates to other devices that that the source device intends to open a link to a destination device and is willing/able to participate in media reuse.

After or concurrent with broadcasting the MRR frame, the source device may open a link to the destination device at 815 and begin transmitting data frames to the destination device at 820.

At 825, a determination may be made if the previously sent frame closed the link to the destination device, or if the link has been closed by some other action. If the link is closed, the process 800 may end at 895.

If the link is not closed, a determination may be made at 830 if an interference notification (IN) frame has been received by the source device. An interference notification frame is a unicast frame sent from a remote device to the source device to indicate that frames transmitted by the source device are being received at the remote device with a signal level above a predetermined threshold level. The predetermined threshold level may be, for example, a signal level that would interfere with reuse of the media at the remote device.

If the source device has not received any IN frames, the source device may assume that either no other device wants to reuse the medium at the present time, or that the source device is transmitting at a low enough power that its transmissions are not interfering with reuse of the medium. In either case, the process 800 may continue to send data frames at 820. The actions at 820 to 830 may be repeated cyclically until the link is closed (yes at 825) or until an IN frame is received (yes at 830). Although FIG. 8 shows the actions at 820 to 830 as sequential, these actions may be performed simultaneously. For example, the source device may transmit data frames continuously at 820 unless interrupted by the closing of the link or receipt of an IN frame.

When an IN frame is received, the source device may attempt to negotiate a lower power level with the destination device at 835. If it is possible without impairing communications between the source and destination devices, the transmission power used by the source and destination devices may be lowered at 835. The process 800 may then continue at 820, where another data frame may be transmitted at the new lower power level.

The actions at 830 and 835 may repeated iteratively. For example the power level used by the source and destination devices may be reduced in steps, until either a minimum power level to sustain reliable communications between the source and destinations devices is reached, or until no further IN frames are received.

Other devices that are not interfered with by transmissions over the link opened at 815 may open a second communication link over the same medium, thus reusing the medium. Any device intending to reuse the medium may also perform the method 800, including broadcasting an MRR frame to all devices, accepting IN frames, and negotiating its transmission power level.

An access point or other BSS controller may monitor all of the simultaneous transmissions that it detects and record such instances in a reuse report. Other devices may optionally do the same. A unicast reuse report request frame may be transmitted by any device to the BSS controller to request the report; the BSS controller may reply with a reuse report response frame containing the current report.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A network device, comprising:
   a processor executing higher layer processes including layers of a protocol stack higher than a media access layer,
   a first physical interface (PHY) coupled to a first communications medium;
   a second PHY coupled to a second communications medium: and
   a media access controller (MAC) to execute the media access layer of the protocol stack, the MAC coupled to the higher layer processes, the first PHY, and the second PHY:
   an association table listing a plurality of known destination MAC addresses and an association between each of the known destination MAC addresses and one of the first PHY and the second PHY; and
   media selection logic to select one of the first PHY and the second PHY for communication with a target device designated by a target MAC address provided by the higher layer processes, wherein
   the media selection logic is configured to determine, upon receipt of a target MAC address from the higher layer processes, whether or not the target MAC address is a known MAC address listed in the association table, and
   when the media selection logic determines that the target MAC address is not a known MAC address, the network device is further configured to perform a discovery process to determine if communications with the target MAC address is possible via one of the first PHY and the second PHY, the discovery process comprising:
      transmitting a first probe frame to the target MAC address via the first PHY;
      if the first probe frame is acknowledged within a first predetermined time period, adding the target MAC addresses in association with the first PHY to the association table;
      if the first probe frame is not acknowledged within the first predetermined time period, transmitting a second probe frame to the target MAC address via the second PHY; and
      if the second probe frame is acknowledged within a second predetermined time period, adding the target MAC addresses in association with the second PHY to the association table.

2. The network device of claim 1, wherein the second communications medium is different from the first communications medium.

3. The network device of claim 1, wherein the MAC has a first MAC addresses associated with the first PHY and the first communications medium, and a second MAC address associated with the second PHY and the second communications medium.

4. The network device of claim 1, wherein the association table lists at least one association between pairs of known MAC addresses that are collocated, one of each pair of known MAC addresses associated with the first PHY and the other of each pair of known MAC address associated with the second PHY.

5. The network device of claim 4, wherein
   when the association table lists an association between the target MAC address associated with one of the first and second PHYs and a collocated alternative MAC address associated with the other of the first and second PHYs, the media selection logic selects one of the first PHY and the second PHY for communicating with the target device.

6. The network device of claim 5, wherein the media selection logic selects one of the first PHY and the second PHY based on conditions of the respectively associated communications media.

7. The network device of claim 5, wherein the media selection logic selects one of the first PHY and the second PHY to minimize the power required to communicate with the target device.

8. The network device of claim 5, further comprising:
   a first queue to hold frames awaiting transmission via the first PHY; and
   a second queue to hold frames awaiting transmission via the second PHY.

9. The network device of claim 8, wherein
   the media selection logic selects the first PHY when the first queue has a shorter wait time than the second queue, and selects the second PHY when the second queue has a shorter wait time than the first queue.

10. The network device of claim 4, wherein the discovery process further comprises:
    if the first probe frame is acknowledged within the first predetermined time period, sending a message via the first PHY requesting the target device to identify any other MAC addresses collocated at the target device, and
    upon receipt of a response indicating an additional MAC address collocated at the target device, storing, in the association table, an association between the target MAC address and the additional MAC address collocated at the target device.

11. The network device of claim 1, wherein the discovery process further comprises:
    if the second probe frame is not acknowledged within the second predetermined time period, returning an error indication to the higher layer processes.

12. The network device of claim 1, wherein
    the MAC is logically opaque, such that the higher layers of the protocol stack are unaware of the presence of two PHYs.

13. The network device of claim 1, wherein
    a common security protocol is employed when communicating via the first PHY and the second PHY.

14. The network device of claim 1, wherein
    the network device is configured to bridge frames between the first communications medium and the second communications medium via the first PHY, the MAC, and the second PHY.

15. The network device of claim 1, wherein
    the first PHY is configured to communicate wirelessly in accordance with a protocol defined in Institute of Electrical and Electronic Engineers (IEEE) Std 802.11, and
    the second PHY is configured to communicate via power line communications.

16. The network device of claim 15, wherein
the higher layers of the protocol stack and the interface between the MAC and the higher layers of the protocol stack are in accordance with a protocol defined in IEEE Std 802.11.

17. A method of operating a media access controller (MAC), the MAC coupled to a processor executing higher layer processes and to first and second physical interfaces (PHYs) coupled respectively to first and second communication media, the method comprising:
  listing, in an association table, a plurality of known destination MAC addresses and an association between each of the known destination MAC addresses and one of the first PHY and the second PHY;
  determining, upon receipt of a target MAC address from the higher layer processes, whether or not the target MAC address is a known MAC address listed in the association table;
  when the target MAC address is a known MAC address, selecting one of the first PHY and the second PHY for communication with a target device designated by the target MAC address; and
  when the target MAC address is not a known MAC address, performing a discovery process to determine if communications with the target MAC address is possible via one of the first PHY and the second PHY, the discovery process comprising:
    transmitting a first probe frame to the target MAC address via the first PHY;
    if the first probe frame is acknowledged within a first predetermined time period, adding the target MAC addresses in association with the first PHY to the association table;
    if the first probe frame is not acknowledged within the first predetermined time period, transmitting a second probe frame to the target MAC address via the second PHY; and
    if the second probe frame is acknowledged within a second predetermined time period, adding the target MAC addresses in association with the second PHY to the association table.

18. The method of claim 17, wherein the discovery process further comprises:
  if the second probe frame is not acknowledged within the second predetermined time period, returning an error indication to the higher layer processes.

19. The method of claim 17, wherein the discovery process further comprises:
  if the first probe frame is acknowledged within the first predetermined time period, sending a message via the first PHY requesting the target device to identify any other MAC addresses collocated at the target device, and
  upon receipt of a response indicating an additional MAC address collocated at the target device, storing, in the association table, an association between the target MAC address and the additional MAC address collocated at the target device.

* * * * *